Nov. 1, 1966

F. B. MERCER 3,281,897

EXTRUDED PLASTIC TUBING

Filed Feb. 12, 1964

INVENTOR
FRANK BRIAN MERCER

BY

ATTORNEY

Nov. 1, 1966 F. B. MERCER 3,281,897
EXTRUDED PLASTIC TUBING
Filed Feb. 12, 1964 3 Sheets-Sheet 2

INVENTOR
FRANK BRIAN MERCER

BY *C. Ralph Snyder*
ATTORNEY

United States Patent Office 3,281,897
Patented Nov. 1, 1966

3,281,897
EXTRUDED PLASTIC TUBING
Frank Brian Mercer, Blackburn, England, assignor to Plastic Textile Accessories Limited, Blackburn, England, a British company
Filed Feb. 12, 1964, Ser. No. 344,400
Claims priority, application Great Britain, Feb. 15, 1963, 6,296/63
3 Claims. (Cl. 18—14)

This invention relates to the manufacture of extruded plastic tubing and has for its object the provision of a method and apparatus for extruding plastic tubing having improved tensile and bursting strength.

By the term "plastic" (as used herein and in the claims) is meant:

(a) a synthetic thermoplastic capable of melt or compression extrusion in a molten state through dies and settable by a cooling medium on issuance from the dies. Suitable or superpolyamides, such as as nylon; polyesters; thermoplastic materials include polyamides polyvinylchloride and copolymers thereof with vinylacetate or vinylidine chloride; polythene and the like and cellulose acetate; or (b) natural or synthetic rubbers, subsequently vulcanised or containing vulcanising agents; or (c) those thermosetting plastic materials or mixtures thereof with thermoplastic materials, which are capable of extrusion.

The invention consists in a method of extruding plastic tubing comprising extruding plastic melt in a plurality of streams closely spaced around the circumference of at least two co-axial circles of slightly differing radii so that one circle lies within the other while relatively displacing the inner and outer streams about their common axis, allowing the streams to combine as inner and outer tube wall zones, while retaining said relative displacement, to form a still confined plastic flow of annular section and of a radial thickness of the same order as that of the combined radial thicknesses of the said inner and outer streams, progressively reducing the radius of said annular flow while continuing the extrusion and finally extruding the plastic as a tube of the diameters, internal and external, required or approximately thereto.

According to the invention, a set forth above, of the inner and outer plastic streams in the inner and outer tube wall zones, at least one of the zone's streams extend helically about the tube axis, while the streams of the other zone extend either axially or helically of the tube, in the latter case the helix angle is of the opposite sense to the helix angle in the other zone or, if of the same sense the helix pitches are different.

The invention further consists in a method of extruding plastic tubing as set forth above wherein after final extrusion of the tube it is externally and/or internally sized to exact diametric dimensions.

The invention still further consists in apparatus for extruding plastic tubing comprising means for feeding plastic under pressure to a pair of circular die carrying members having contacting slideways, and, on each side of the slideways, circumferentially spaced die orifice means, the die orifice means feeding a convergent annular-section passageway formed between inclined wall surfaces one of each die member and the convergent passageway feeding an annular tube extrusion slot of smaller diameter than that of the slideways and corresponding to the dimension of the tubular product required, and means for relatively displacing the die members about their common axis, so that the die orifices, the walls defining the convergent passageway and the walls defining the tube extrusion slot are relatively counter-rotated.

According to the invention the die orifice means may comprise axially extending slots in each die member opening out onto the slideways and/or bores spaced from but generally parallel to said slideways, the die orifice means communicating at one end with a supply of plastic under pressure and at the other end with the convergent passageway.

The product plastic tubing, according to the present invention and as set out in the four preceding paragraphs is characterised by a wall in which the plastic is flow orientated (i.e., molecularly orientated) in two radially spaced inner and outer tubular zones, the direction of flow orientation in at least one of the zones being helically of the tube. Where the directions of flow orientation of each zone is helical, the helices are either of opposite sense or of different pitch, but in all cases the directions of flow orientation are transverse to one another. The transverse flow orientation of the plastic in the two zones is brought about by creating distinct linear flow plastic streams by passing the plastic through the circumferentially spaced relatively counter-rotating die orifice means in the die members, each die orifice acting on the plastic flowing therethrough to impart to the plastic a degree of molecular orientation. The subsequent passage of the plastic through the convergent passageway and annular tube extrusion slot or through the subsequent sizing means largely or wholly obliterates any outward trace of such flow orientation, except as described hereinafter.

As stated above, the apparatus for extruding plastic tube according to the present invention may also include sizing means for finishing the finally extruded tube to size; such sizing means may be of known character for sizing extruded plastic tubing. For example, for external sizing, the tubing on extrusion passes into a water cooled tubular, polished-wall, mould disposed co-axially of, and adjacent, the annular tube extrusion slot and the tube is pressed against the mould wall by air pressure within the tube supplied from a source of pressurized air fed axially through the extrusion device and within the extruded tube, the open end of the extruded tube having been first closed or sealed in any suitable manner.

To produce an extruded plastic tube in which the outward appearance of the orientation flows of the plastic in the two zones is largely or wholly obliterated it is required that the die orifice means in each die member are small, numerous and closely spaced; if either or both of the die members are provided with die orifices which are coarse and more widely spaced, outward traces of the orientation flows may persist after extrusion.

The invention may be carried into effect according to one mode by way of example using extrusion apparatus having circular co-axial die members generally as described in British Patent No. 836,555, but modified as described below.

The extrusion head (see FIGURES 1, 2 and 3) comprises a composite inner die member 1 and a composite outer die member 2 between which is defined a chamber 3 for the pressurized supply of plastic. Means (not shown) are provided for causing relative rotation between the die members 1 and 2, so that both the latter may rotate oppositely as indicated by the arrows in FIGURE 3, giving a product of the character shown in FIGURE 7, or only one die member may rotate, giving a product of the character shown in FIGURE 9, which products will be described in more detail hereinafter.

Figure 1:
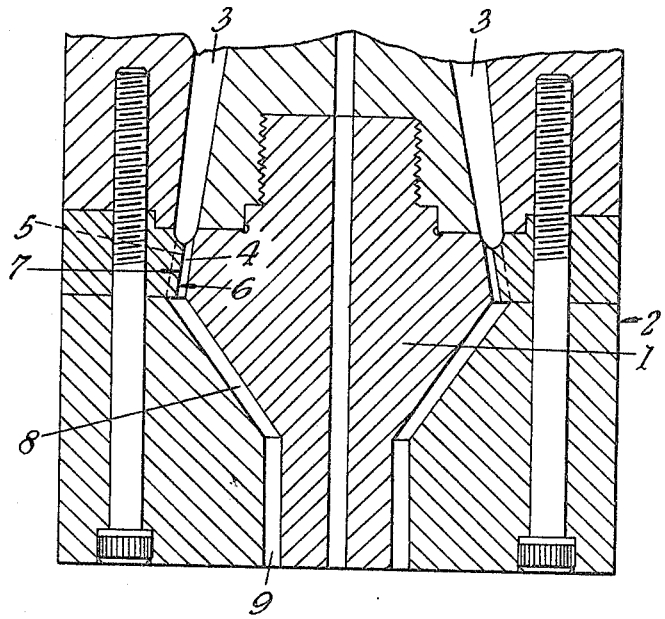
FIGURE 1 is a cross section of one form of the die members of a plastic tube extrusion head, according to the present invention.
Figure 2:
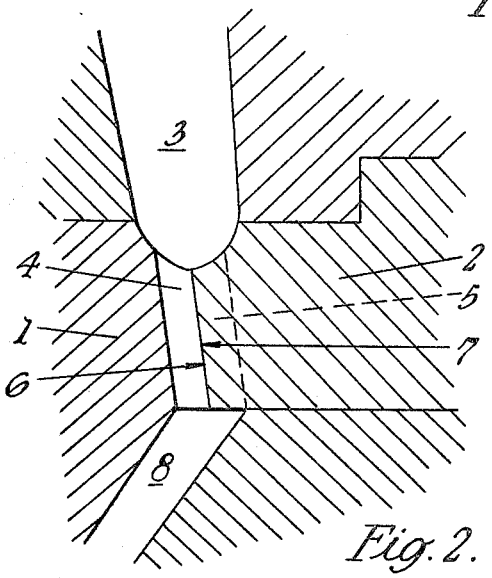
FIGURE 2 is a section on an enlarged scale of part of the die means of FIGURE 1.
Figure 3:
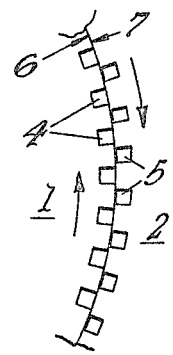
FIGURE 3 is an underside plan view of the die orifices only of the die members shown in FIGURE 2.

At the end of the chamber 3 are located two sets of die orifice means 4 and 5 in the inner and outer die members 1 and 2 respectively; in FIGURES 1 to 3 the die orifice means 4 and 5 comprise open-sided slots opening out onto slideway surfaces 6 and 7 on the die members 1 and 2 which surfaces are in contact to form a bearing.

The die orifice means 4 and 5 discharge into a convergent passageway 8 of annular cross-section which terminates in an annular tube extension slot 9 from which the tubing finally emerges for further sizing if required as will be described.

Figure 4:
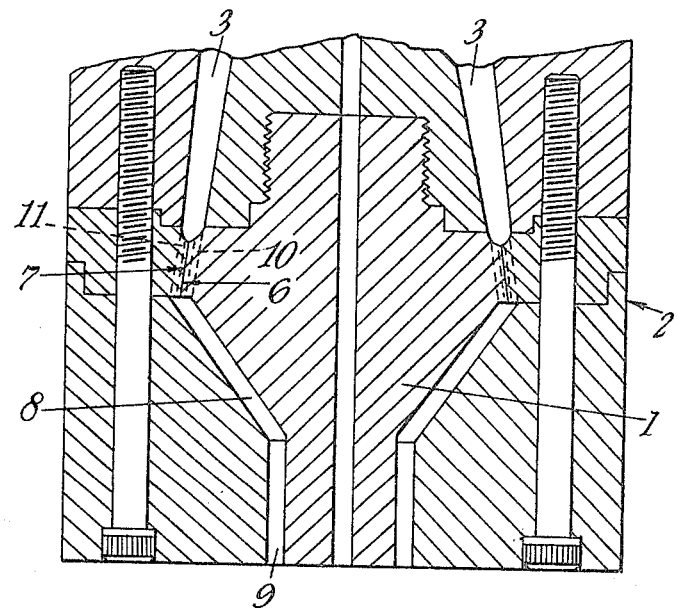
FIGURES 4, 5 and 6 are views similar to FIGURES 1, 2 and 3 respectively but showing modified die orifice means.
Figure 5:
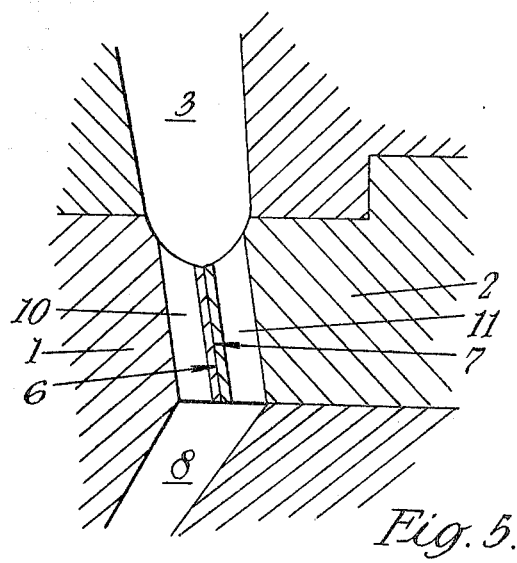
Figure 6:
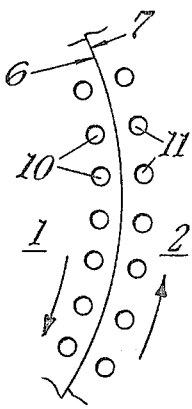

The extrusion head shown in FIGURES 4, 5 and 6 is the same as shown in FIGURES 1, 2 and 3 except that the die orifice means 10 and 11, instead of being open-sided slots, are individual bores spaced from the slideway surfaces 6 and 7 by a small amount.

In operation plastic is forced under pressure through the die orifice means 4 and 5 (FIGURE 1) or 10 and 11 (FIGURE 4) so that the plastic reaches the convergent passageway 8 in a plurality of linear streams which are caused to be displaced relative to one another with respect to the common axis of the die members 1 and 2 so that the plastic streams from at least one of the sets of die orifice means 4 or 5 (FIGURE 1) or 9 or 10 (FIGURE 4) are helically disposed about said axis.

The passageway of the plastic through the die orifice means causes the plastic to undergo a degree of molecular orientation which may be termed "flow orientation" in contrast to the orientation achieved in a set plastic by stretching the same.

Figure 7:
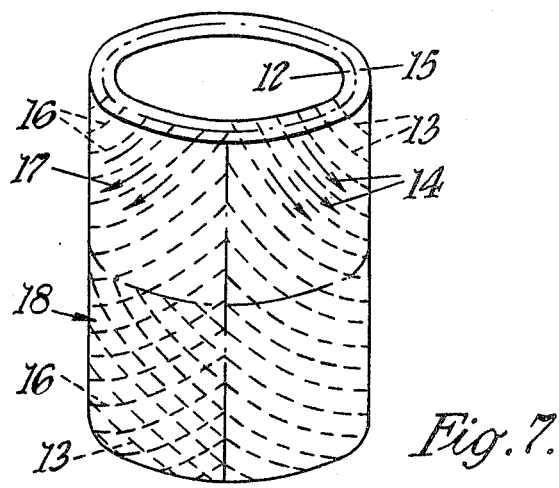
FIGURE 7 is a diagrammatic view of one form of extruded plastic tube according to the present invention.
Figure 8:
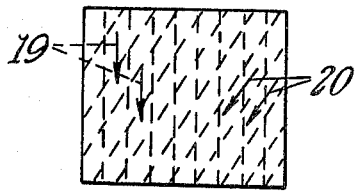
FIGURES 8 and 9 are diagrammatic views of modified tube wall constructions according to the present invention.
Figure 9:
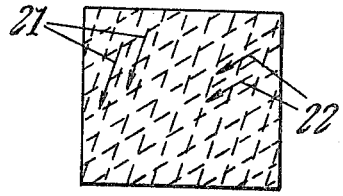

FIGURES 7, 8 and 9 show diagrammatically the orientating plastic flows as follows:

In FIGURE 7 the plastic flows leaving the inner and outer die members (which have been equally counter-rotated) are opposite helices about the tube axis. Thus the inner peripheral zone 12 of the tube is made up of helically laid streams 13 of plastic extending in the direction of the arrows 14 having been extruded from the die orifice means 4 (FIGURE 1) or 10 (FIGURE 4) of the inner die member 1, and the outer peripheral zone 15 of the tube is made up of oppositely helically laid streams 16 of plastic extending in the direction of the arrows 17 having been extruded from the die orifice means 5 (FIGURE 1) or 11 (FIGURE 5) of the outer die member 2. Thus the streams 13 and 16 cross one another as shown in position 18 of FIGURE 7 and act in the manner of oppositely laid helices of reinforcement or the like in non-homogeneous wall tubes (e.g., hose) to increase bursting strength by eliminating lines of weakness.

Similarly in FIGURE 8 two zones of plastic flow are present but one die member is stationary while the other rotates giving rise to axially extending plastic streams 19 and helically extending plastic streams 20.

In FIGURE 9 both die members are rotated in the same sense but at different angular velocities so that in one zone the plastic streams 21 are at greater helical pitch than the other plastic streams 22.

When the streams of plastic leave the die orifice means they enter the convergent passageway 8 which condenses the plastic flows so that while the flow orientation still remains within the plastic any outward or visible traces of the separate plastic streams are largely or wholly obliterated, so that after final gauging in the annular extrusion slot 9 the tubing emerges with a wall having an even or substantialy even surface. If the die orifice means in the die members 1 and 2 are coarse and widely spaced, traces of the separate plastic streams may persist in the extruded tubing but it is preferred to provide die orifice means such that this is eliminated as much as possible, for example, to produce a 1⅛ inch external diameter tube having a wall thickness of 5/32 inch, the diameter of the die members 1 and 2 at the slideway surfaces 6 and 7 as 2½ inches and each die member has 72 die orifice means.

The tubing as extruded from the annular slot 9 may be further treated by sizing in known manner as mentioned above, but as such treatment is already known it has not been illustrated or further described.

I claim:
1. Apparatus for extruding plastic tubing comprising means for feeding plastic under pressure to a pair of circular die carrying members having contacting slideways and, on each side of the slideways, circumferentially spaced die orifice means, the die orifice means feeding a convergent annular-section pasageway formed between inclined wall surfaces one of each die member and the convergent passageway feeding an annular tube extrusion slot of smaller diameter than that of the slideways and corresponding to the dimension of the tubular product required, and means for relatively displacing the die members about their common axis, so that the die orifices, the walls defining the convergent passageway and the walls defining the tube extrusion slot are relatively counter-rotated.

2. Apparatus for extruding plastic tubing as claimed in claim 1, wherein the die orifice means comprise axially extending slots in each die member opening out onto the slideways, the die orifice means communicating at one end with a supply of plastic under pressure and at the other end with the convergent passageway.

3. Apparatus for extruding plastic tubing as claimed in claim 1, wherein the die orifice means comprise axially extending bores spaced from but generally parallel to said slideways, the die orifice means communicating at one end with a supply of plastic under pressure and at the other end with the convergent passageway.

References Cited by the Examiner
UNITED STATES PATENTS

| | | | |
|---|---|---|---|
| 2,345,086 | 3/1944 | Becker et al. | 18—13 |
| 2,682,081 | 6/1954 | Fisch | 18—14 XR |
| 2,714,744 | 8/1955 | Becker | 18—14 |

WILLIAM J. STEPHENSON, *Primary Examiner.*